United States Patent [19]

Thuries

[11] Patent Number: 4,968,875
[45] Date of Patent: Nov. 6, 1990

[54] CELL FOR A MEDIUM OR HIGH TENSION METACLAD STATION, AND A STATION MADE UP OF SUCH CELLS

[75] Inventor: Edmond Thuries, Pusignan, France

[73] Assignee: Societe Anonyme dite : Alsthom, Paris, France

[21] Appl. No.: 338,907

[22] Filed: Apr. 14, 1989

[30] Foreign Application Priority Data

Apr. 18, 1988 [FR] France .................. 88 05077

[51] Int. Cl.$^5$ .......................................... H01J 40/14
[52] U.S. Cl. ..................................... 250/208.4; 361/1
[58] Field of Search ................... 250/208.4; 315/159, 315/151; 361/1, 88, 67; 340/638, 644; 307/117

[56] References Cited

U.S. PATENT DOCUMENTS

| 4,042,968 | 8/1977 | Kypreos ........................... 361/67 |
| 4,215,256 | 7/1980 | Sakaguchi et al. .......... 200/148 D |
| 4,685,018 | 8/1987 | Tada et al. ........................ 361/1 |

FOREIGN PATENT DOCUMENTS 0197778 10/1986 European Pat. Off. .
3034021 3/1982 Fed. Rep. of Germany .
3109669 11/1982 Fed. Rep. of Germany .

OTHER PUBLICATIONS

French Search Report, Dec. 6, 1988, by Examiner C. G. Woodall.

Primary Examiner—David C. Nelms
Assistant Examiner—Sherrie Hsia
Attorney, Agent, or Firm—Sughrue, Mion, Zinn, Macpeak & Seas

[57] ABSTRACT

The invention relates to a cell for a medium or high tension metalclad station, and to a station constituted by such cells. The cell is characterized in that the following are disposed inside the envelope thereof: a three-pole, three-phase breaker-disconnector (100, 78); at least one grounding three-phase disconnector (122); a photodiode (55A) supplying a signal in the event of arcing appearing inside the cell; and, for each pole, a cable outlet connected to a respective one of the terminals of the breaker-disconnector and passing through the envelope via a respective sealed feedthrough.

8 Claims, 8 Drawing Sheets

CELL FOR A MEDIUM OR HIGH TENSION METACLAD STATION, AND A STATION MADE UP OF SUCH CELLS

The present invention relates to a medium or high tension electricity distribution station of the metalclad type, i.e. a station in which the main components are insulated from one another by a gas having good dielectric properties, e.g. by sulfur hexafluoride at a pressure of a few bars.

BACKGROUND OF THE INVENTION

Stations of this type are already known comprising a plurality of cells each having a distribution outlet and each containing a circuit breaker between two disconnectors.

Such a station is described, for example, in European patent application No. 0 197 778.

An object of the invention is to provide a distribution station which is cheaper.

SUMMARY OF THE INVENTION

This object is achieved by replacing the circuit breakers and the disconnectors with apparatuses of the breaker-disconnector type.

A breaker-disconnector (or a switch-disconnector) is a switch which, in the open position, satisfies the isolating requirements specified for a disconnector.

A definition on these lines is given by the "International Electrotechnical Commision" in its "International Electrotechnical Vocabulary" at chapter 441 "Equipment and Fuses", 3nd edition, 1984, page 12, No. 441-14-12, published in Geneva, Switzerland.

In such an apparatus, any leakage current past the disconnector must be lost to ground and must not reach the inlet or the outlet.

Another object of the invention is to provide a station in which a faulty cell can easily be dismantled for replacement or for replacement of its faulty components.

BRIEF DESCRIPTION OF THE DRAWINGS

Embodiments of the invention are described by way of example with reference to the accompanying drawings, in which.

DETAILED DESCRIPTION

Figure 1:
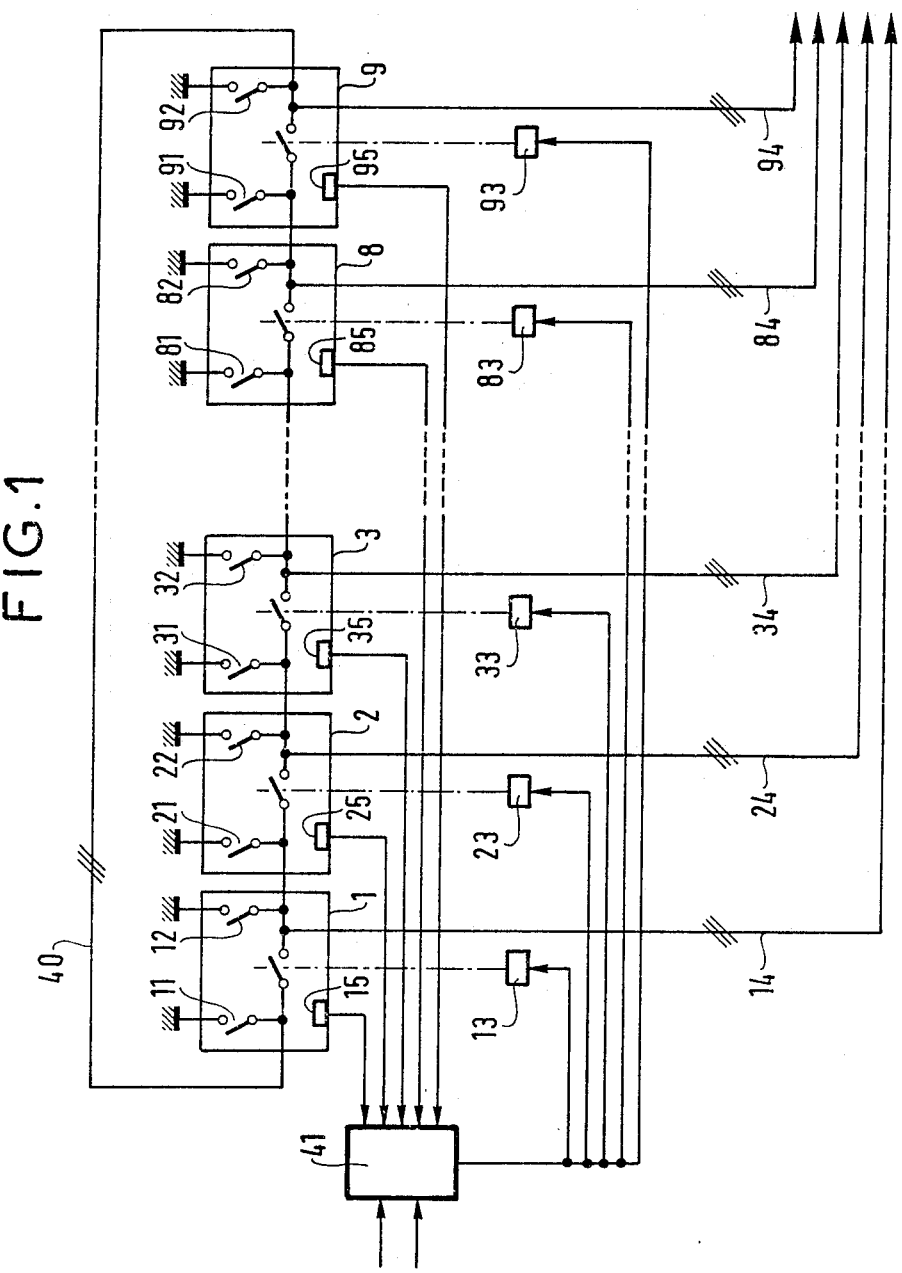
FIG. 1 is an electrical circuit diagram showing a looped station.

FIG. 1 is a diagram of a medium or high tension station, more particularly a three-phase station operating at 72.5 kV and including a plurality of metalclad cells 1, 2, 3, 8, 9 which connected are electrically in series and which are interconnected by a loop 40.

Each cell is filled with a dielectric gas such as sulfur hexafluoride under pressure, and it contains a breaker-disconnector 10, 20, 30, ..., 80, 90 between two grounding disconnectors 11 & 12, 21 & 22, 31 & 32, 81 & 82, and 91 & 92.

Each cell includes a control member 13, 23, 33, ..., 83, 93 controlled by an electronic control circuit 41.

A distribution cable 14, 24, 34, ..., 84, 94 runs from each cell.

Each cell has a photodiode 15, 25, 35, ..., 85, 95) placed therein and connected to the electronic control circuit.

In the event of a fault in a cell (arcing), an arc is detected by the corresponding diode which instructs the circuit 41. The circuit 41 is programmed firstly to apply an opening instruction to the cells on either side of the faulty cell and secondly to inhibit the signals emitted by the diodes detecting the opening of the breaker-disconnectors in these cells. Without such inhibition, all of the breaker-disconnectors of the station would be opened in turn.

Figure 2:
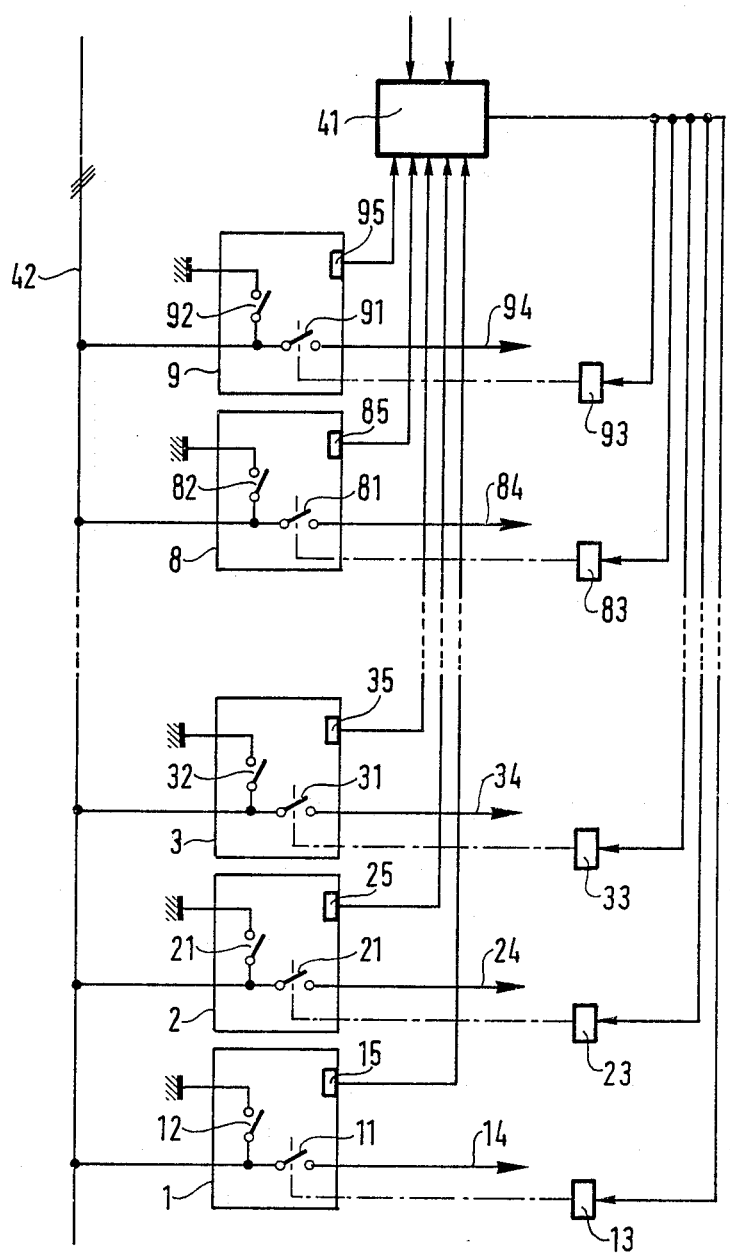
FIG. 2 is an electrical circuit diagram of a station having a set of bus bars common to the cells.

FIG. 2 shows another embodiment of a station of the type having a set of bus bars.

In FIG. 2, this set of bus bars is designated by reference 42 and items which are common to FIGS. 1 and 2 are given the same reference numerals.

The outlets 14, 24, 34, ..., 84, 94 are taken in parallel from the set of bus bars 42.

The cells 1, 2, 3, ..., 8, 9 contain respective three-phase breaker-disconnectors 11, 21, 31, ..., 81, 91, a single grounding disconnector 12, 22, 32, ..., 82, 92 upstream from the breaker-disconnector, and a photodiode 15, 25, 35, ..., 85, 95 connected to a control circuit 41 which delivers instructions to the operating members 13, 23, 33, ..., 83, 93 of the breaker-disconnectors.

Figure 3:
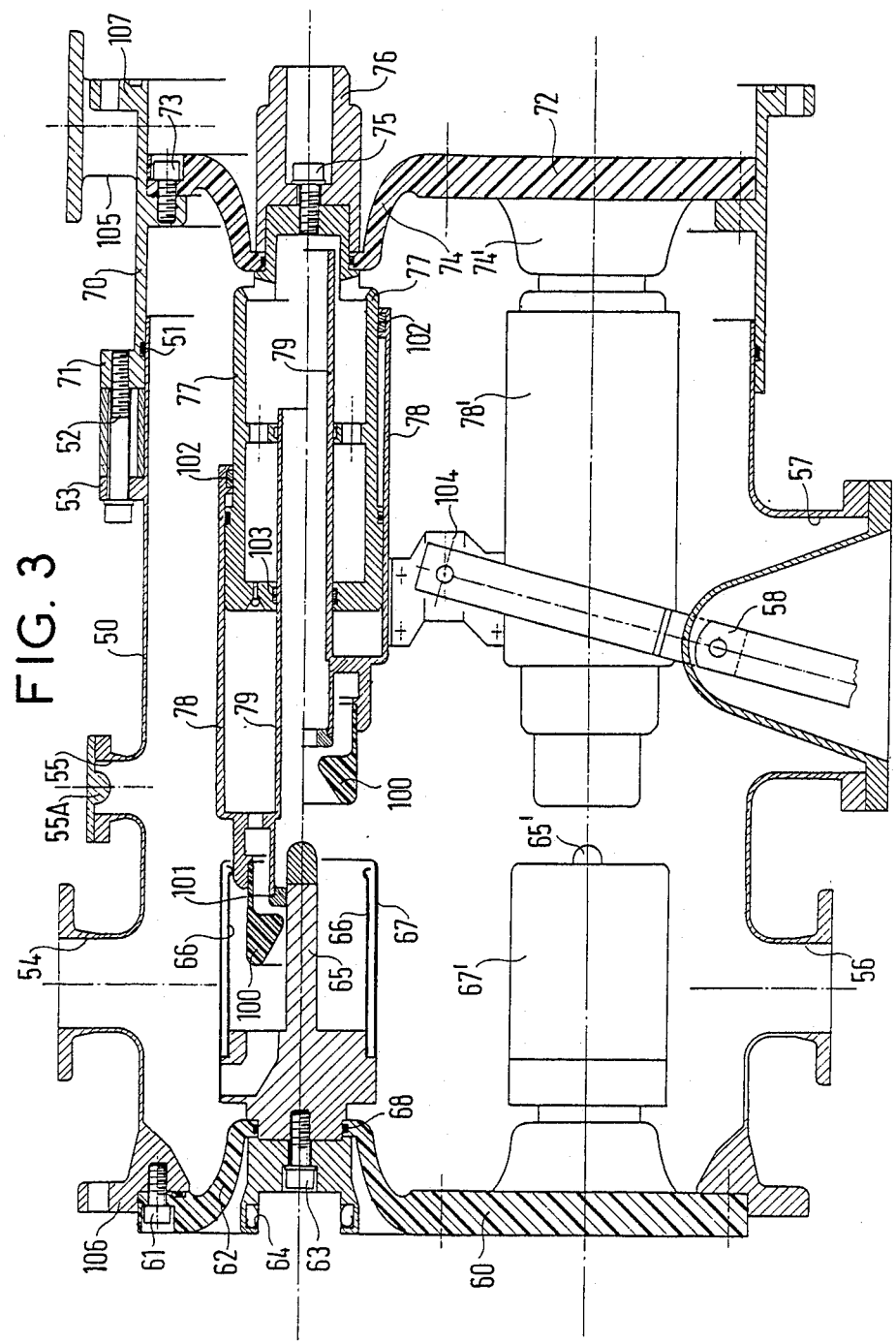
FIG. 3 is an elevation view in partial section through a cell for constituting a station in accordance with the invention.

FIG. 3 is an elevation view in partial section of a three phase cell comprising the three poles of a breaker-disconnector. The cell is well adapted to constituting a station in accordance with the loop circuit shown in FIG. 1. The three poles of the breaker-disconnector are disposed along three parallel lines disposed on the vertices of a prism having an equilateral base. Only one pole is described in detail.

The cell comprises a cast metal body which is generally cylindrical in shape and constituted by two cylindrical parts 50 and 70 which interfit in each other with sealing being provided by a sealing ring 51.

A screw 52 co-operates with a lug 53 in the part 50 and a lug 71 on the part 70 in order to hold the two parts together.

It can be seen that in accordance with a characteristic of the invention, the two parts 50 and 70 can be moved towards each other or away from each other by sliding, thereby facilitating dismantling of a cell forming a part of a group of cells, as explained below. It may be observed that each cell may have several pairs of lugs 53 and 71.

For each pole, the part 50 has an opening 54 through which a grounding disconnector passes and is fixed, and it also has an opening 55 for receiving a photodiode 55A, an opening 56 for a cell inlet or outlet, and an opening 57 for passing an operating mechanism 58.

The part 50 is closed by a plate 60 fixed by means of bolts such as 61.

The plate 60 has three open depressions such as 62 each serving to fix a block 64 of female contacts outside the cell by means of a screw 63 to the fixed portion of one of the poles of the breaker-disconnector which includes, in particular, an arcing contact 65, permanent contact fingers 66, and an anticorona cap 67. Sealing is provided by a sealing ring 68.

The part 70 is closed by a plate 72 fixed by means of bolts such as 73.

The plate includes three depressions such as 74 for fixing a male contact block 76 outside the cell via a screw 75 to a support block 76 for the moving equipment of one of the poles of the breaker-disconnector.

The moving equipment comprises two coaxial tubes 78 and 79 which are fixed to each other. The tube 78 constitutes the permanent moving contact and carries a blast nozzle 100.

The tube 79 is terminated by fingers 101 of the arcing contact.

The block 77 carries sliding contacts such as 102 and 103 for passing electrical current.

The tube 78 is connected to the control member 58 via a block 104 which is common to all three poles.

The part 70 includes an opening 105 for passing and fixing a grounding disconnector.

Figure 4:
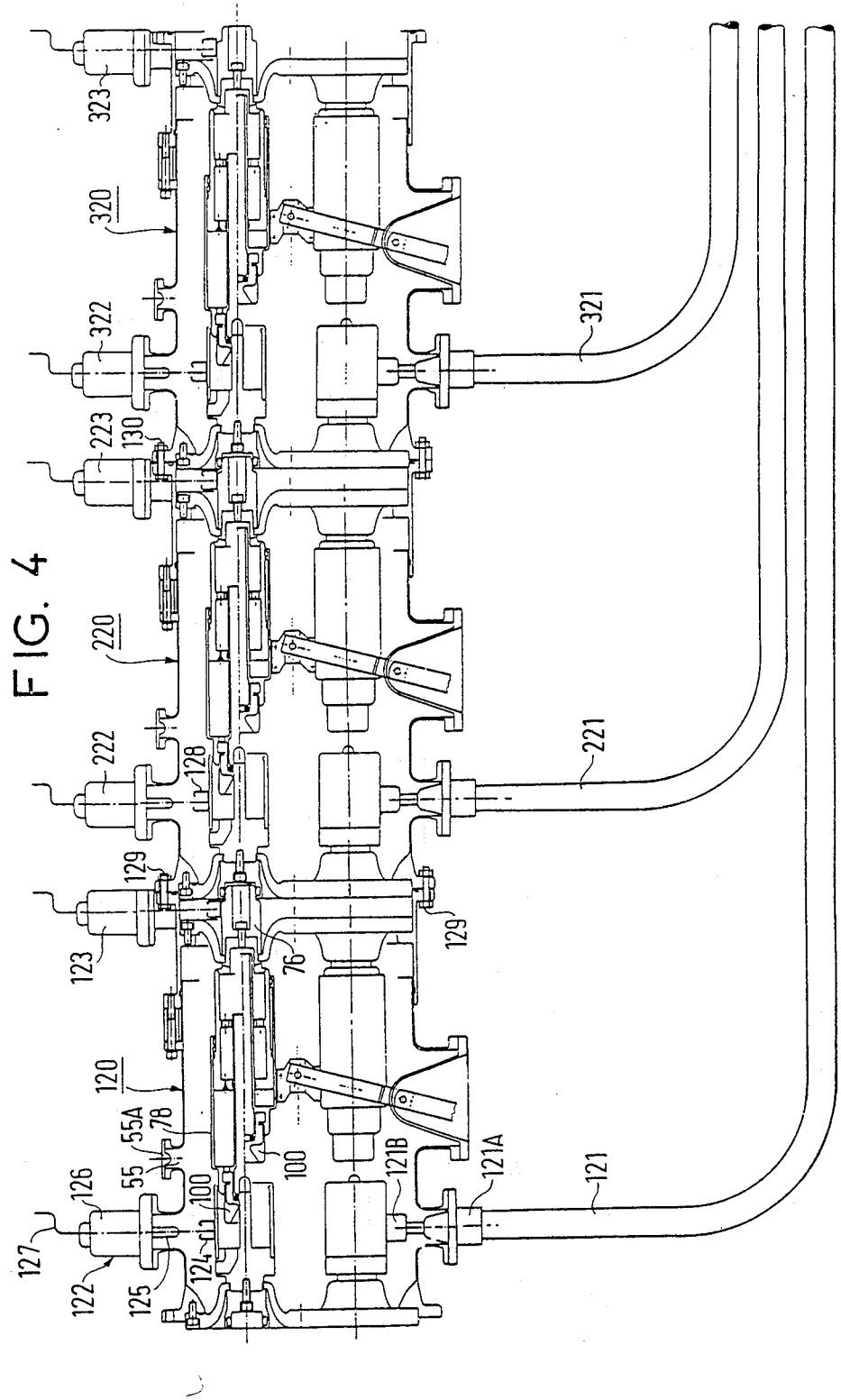
FIG. 4 is a fragmentary view of a station showing three cells assembled together.

The parts 50 and 70 have tabs, e.g. tabs 106 and 107, respectively, for fixing pairs of adjacent cells together by means of bolts such as 129 and 130 (FIG. 4).

FIG. 3 shows the second pole of the breaker-disconnector where those items which are visible are referenced using the same numbers as the pole described in detail above, but including the "prime" symbol.

The third pole cannot be seen in the figure.

The cell constituted in this way is well suited to constituting a loop station with the cells being interengaged in pairs with their contacts 64 and 76 co-operating for providing electrical continuity.

As explained below with reference to FIGS. 4 to 7, it is easy to replace a faulty cell without completely interrupting operation of the station.

FIG. 4 shows three adjacent cells in a loop station which may include many more than three cells.

These cells are referenced 120, 220, and 320, and the cable outlets from each of them are referenced 121, 221, and 321. For each pole, these outlets comprise a sealed feed-through 121A and a connection 121B connected to the fixed assembly of the breaker-disconnector.

The grounding disconnectors which do not appear in FIG. 3 are shown and they are referenced 122 & 123, 222 & 223, and 322 & 323.

A disconnector such as 122 comprises a fixed contact 124 fixed to the cap 100 and a moving contact 125 associated with a support block 126 and provided with a control mechanism 127 which is not shown in detail, but which is conventional.

The disconnector 123 is identically constituted, with the fixed contact 128 being fixed to the same block as the male contact 76.

The references 129 designate the bolts holding the cells together. The portion of the station shown in FIG. 4 is shown in normal operation: its grounding disconnectors are open while its breaker-disconnectors are closed.

Assume that arcing has taken place in the cell 220 and that it is to replaced.

The arcing is detected by photodiode 55A which causes the breaker-disconnectors of the cells 120 and 320 on either side of the faulty cells to open.

The grounding disconnectors 123 and 322 on either side of the faulty cell are closed. Outlet 121 remains in operation. The bolts 130 are removed.

The bolts 52 are also removed and the portions 50 and 70 of the cells are moved toward each other (FIG. 5), thereby enabling the male contact 76 of the faulty cell 220 to be disengaged from the female contacts 64 of the adjacent cell 320.

Figure 5:
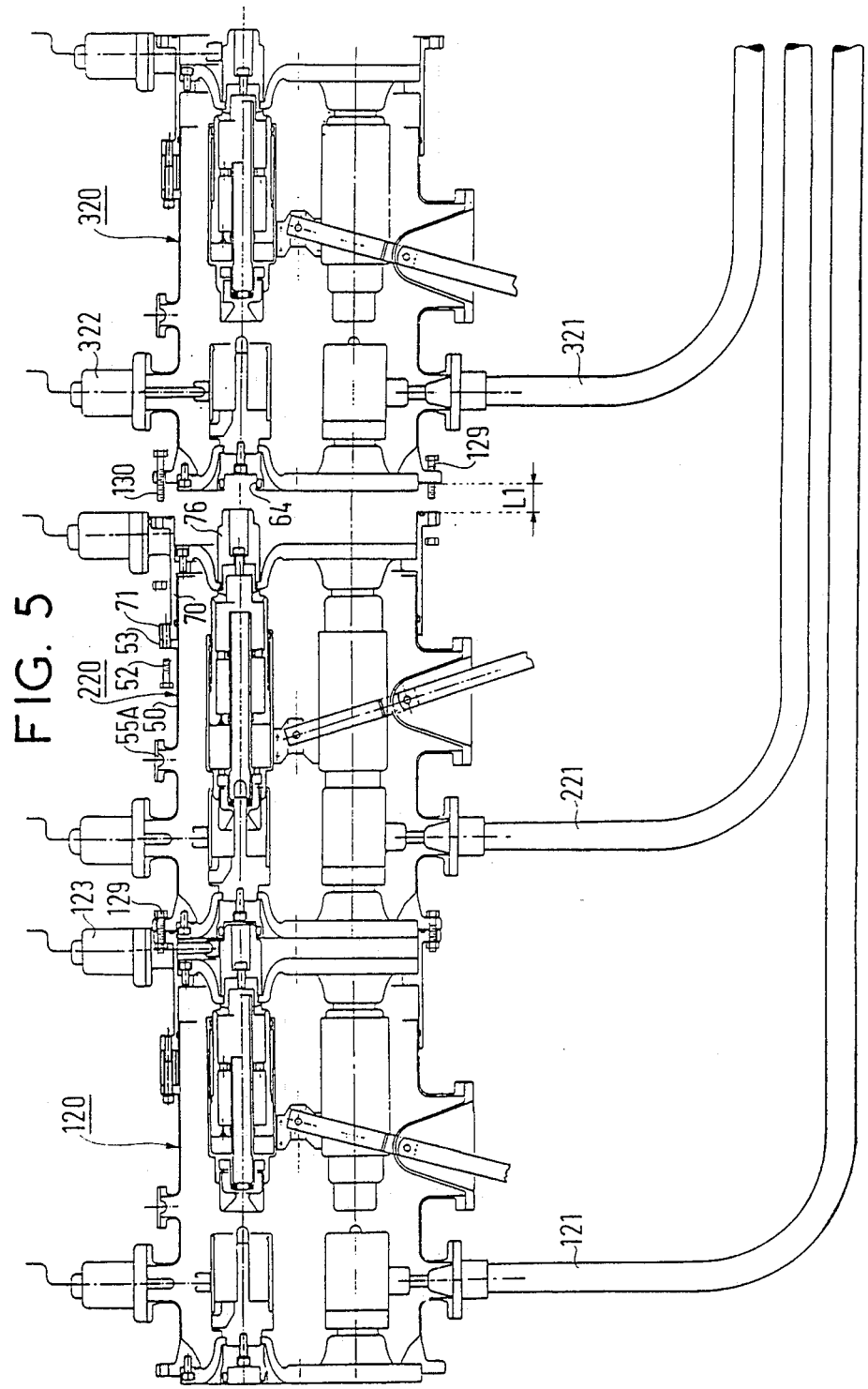
FIGS. 5 to 7 are views of the same portion of a station while replacing a faulty cell.

This operation serves to disengage a space of width L1 between the cells 220 and 320, as shown in FIG. 5.

The bolts 120 are removed.

Figure 6:
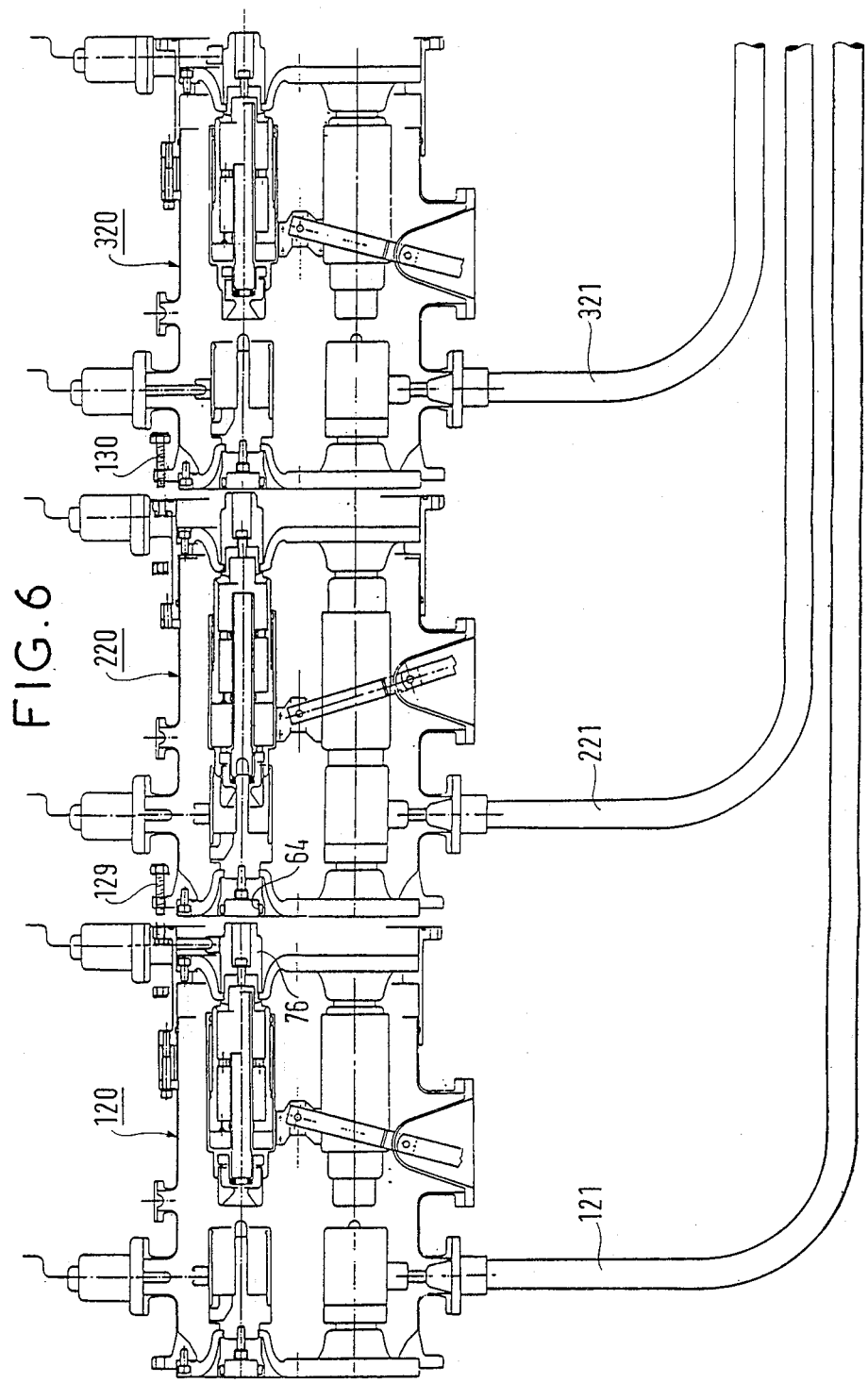
Figure 7:
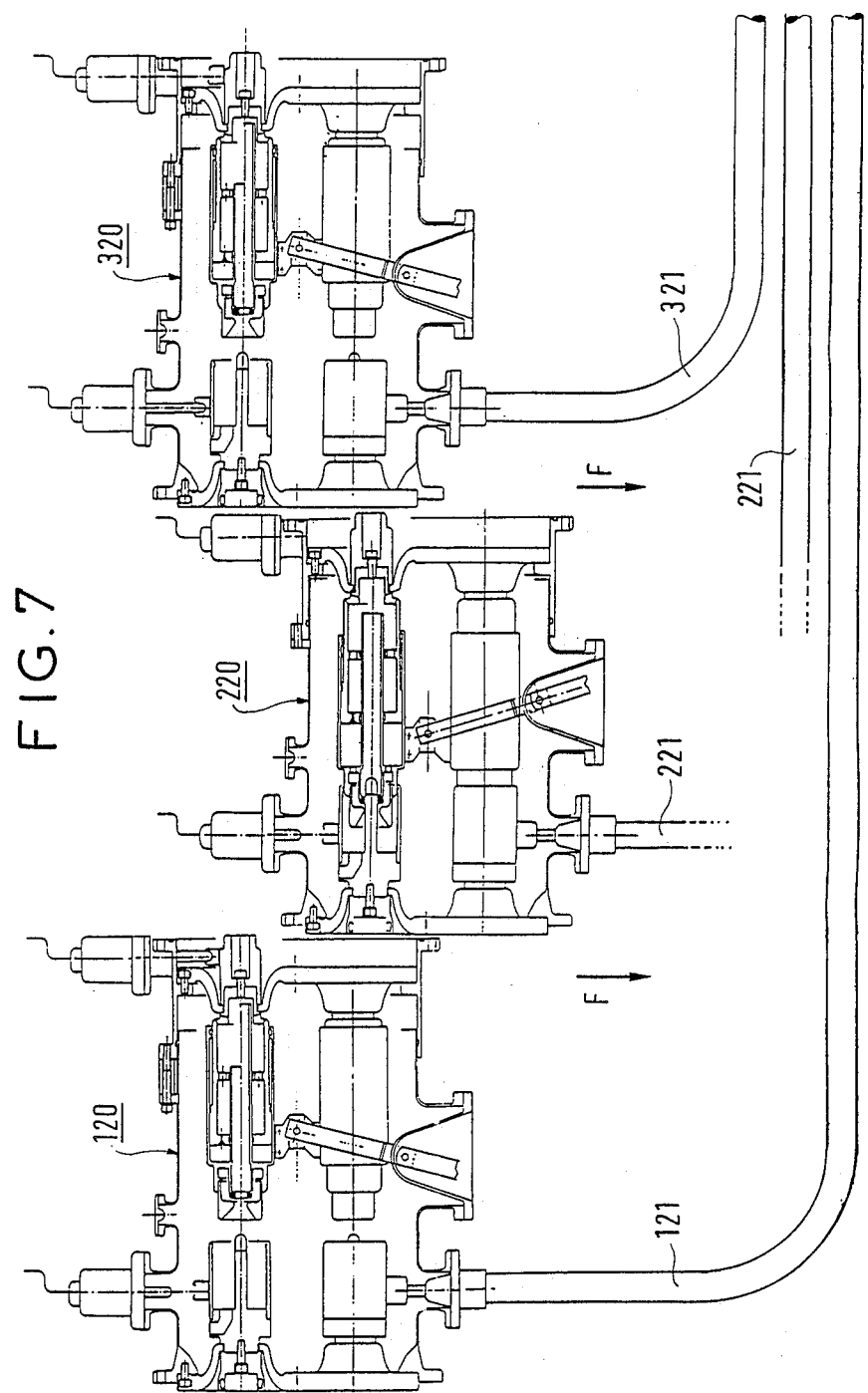

The cell 220 is displaced along its axis so as to disengage the male contact 76 of the cell 120 from the female contact 64 of the cell 220 (FIG. 6).

The cell 220 can then be displaced perpendicularly to its axis of symmetry (along arrow F, FIG. 7) in order to disengage it from the assembly and either replace it or else return it to position after it has been repaired by performing the same operations in reverse order.

It may be observed that all of these operations can be performed without danger to personnel since no portion which is not grounded is accessible to the operator.

The above-described cell achieves the objects specified:

it is cheap to manufacture;

there is an increase in service continuity and security; and maintenance is facilitated without danger to personnel.

The cells described may also be used for building up a station having two sets of bus bars.

Figure 8:
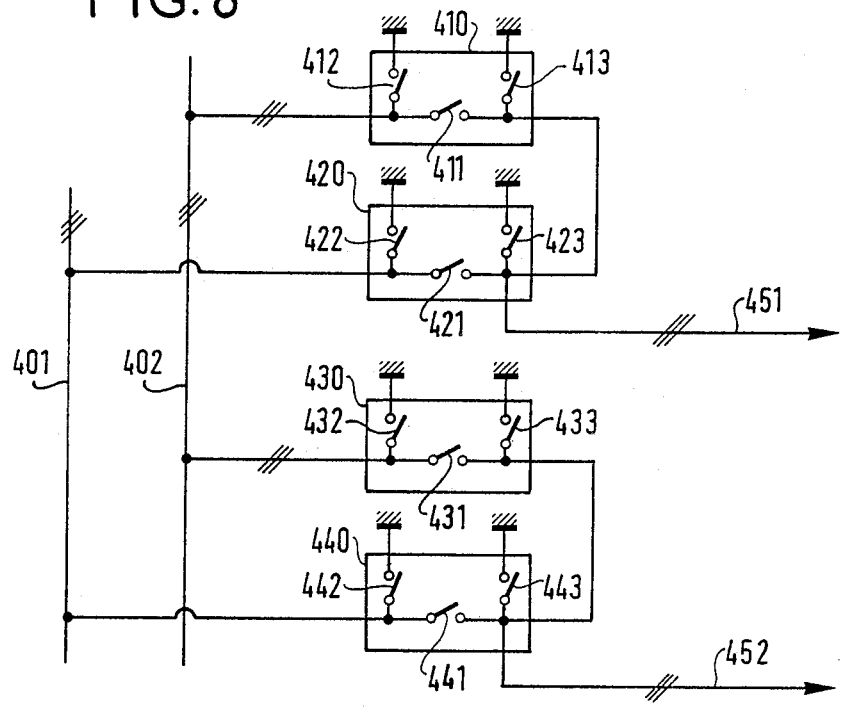
FIG. 8 is an electrical circuit of a station having two sets of bus bars in a first configuration.

Such a station is shown in FIG. 8 in which two sets of bus bars 401 and 402 can be seen feeding pairs of cells connected in series, e.g. 410 & 420 and 430 & 440. The cells 410 to 440 include breaker-disconnectors 411, 421, 431, and 441 surrounded by respective grounding disconnectors 412 & 413; 422 & 423; 432 & 433; and 434 & 435.

Each pair of cells has an outlet connected to the point which is common to both cells.

The outlets are referenced 451 and 452 in the figure.

Figure 9:
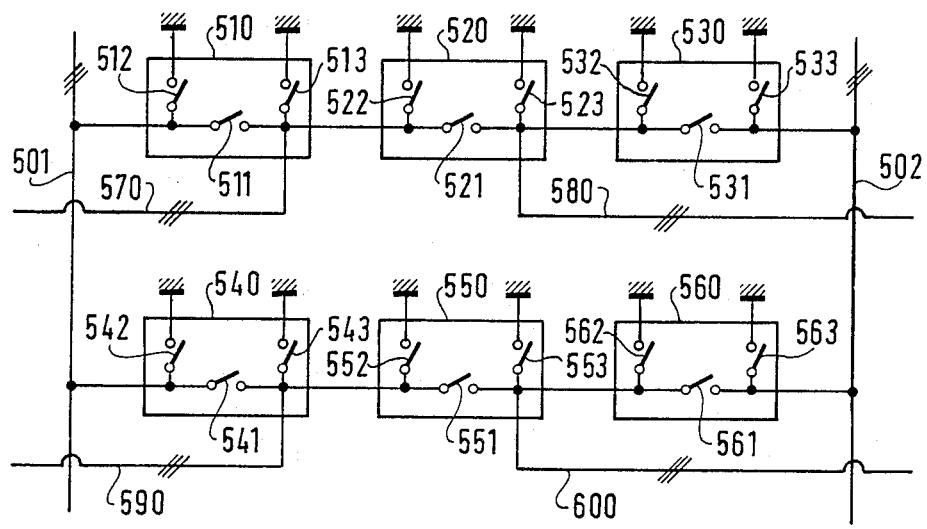
FIG. 9 is an electrical circuit diagram of a station having two sets of bus bars in another configuration.

A variant station with two sets of bus bars referred to as "a breaker and a half" is shown in FIG. 9.

Sets of three cells in series such as the set 510, 520, and 530 or the set 540, 550, and 560 are disposed between the two sets of bus bars 501 and 502. Each set has two outlets referenced 570 & 580 for the first set and 590 & 600 for the second set and these outlets are connected to the common points between pairs of adjacent cells.

Each cell includes a breaker-disconnector 511, 521, 531, 541, 551, 561 surrounded by two grounding disconnectors 512 & 513, 522 & 523, 532 & 533, 542 & 543, 552 & 553, and 562 & 563.

I claim:

1. A three-phase cell for a medium or high-tension metalclad station, the cell comprising an envelope filled with a dielectric gas under pressure with a photodiode disposed therein to provide a signal in the event of an arc appearing, wherein said envelope contains: a three-pole three-phase breaker-disconnector; at least one three phase grounding disconnector; and a cable outlet for each pole connected to a respective one of the terminals of the breaker-disconnector and passing through the envelope via a respective sealed feedthrough.

2. A cell according to claim 1, including two grounding disconnectors, one on either side of the breaker-disconnector.

3. A cell according to claim 1, wherein the envelope is closed by two end plates of insulating material, one of said end plates having three male contacts outside the cell and electrically connected through said end plate to respective first terminals of the three poles of the breaker-disconnector, the other end plate having three female contacts outside the cell and respectively electrically connected through said end plate to the other terminals of the three poles of the breaker-disconnector.

4. A cell according to claim 1, wherein said envelope comprises two cylindrical portions sliding in each other, with a sealing ring being interposed therebetween.

5. A medium or high tension metalclad station, comprising: a plurality of three-phase cells, each three-phase cell comprising an envelope filled with a dielectric gas under pressure with a photodiode disposed therein to provide a signal in the event of an arc appearing, wherein said envelope contains: a three-pole, three-phase breaker-disconnector; at least one three-phase grounding disconnector; and a cable outlet for each pole connected to a respective one of the terminals of the breaker-disconnector and passing through the envelope via a respective sealed feedthrough, and a means connecting said plurality of cells in parallel on a set of bus bars.

6. A medium or high tension metalclad station, comprising a plurality of three-phase cells, each three-phase cell comprising an envelope filled with a dielectric gas under pressure with a photodiode disposed therein to provide a signal in the event of an arc appearing, wherein said envelope contains: a three-pole three-phase breaker-disconnector; at least one three-phase grounding disconnector; a cable outlet for each pole connected to a respective one of the terminals of the breaker-disconnector and passing through the envelope via a respective sealed feed through, said envelope being closed by two end plates of insulating material, one of said end plates having three male contacts outside the cell and electrically connected through said end plate to respective first terminals of the three poles of the breaker-disconnector, the other end plate having three female contacts outside the cell and respectively electrically connected through said end plate to the other terminals of the three poles of the breaker-disconnector, wherein said plurality of cells are connected in a loop, with the outside male contacts of one cell being in contact with the outside female contact of an adjacent cell, and with said plurality of cells including end cells interconnected by a link for closing the loop.

7. A medium or high tension metalclad station of the type having two sets of bus bars, comprising, disposed between said two sets of bars, at least one pair of three-phase cells, each three-phase cell comprising an envelope filled with a dielectric gas under pressure with a photodiode disposed therein to provide a signal in the event of an arc appearing, wherein said envelope contains: a three-pole, three-phase breaker-disconnector; at least one three-phase grounding disconnector; and a cable outlet for each pole connected to a respective one of the terminals of the breaker-disconnector and passing through the envelope via a respective sealed feedthrough, and wherein said at least one pair of cells are connected in series, with an outlet from a common point between the two cells of the pair.

8. A medium or high tension metalclad station of the type having two sets of bus bars, comprising, disposed between said two sets of bus bars, at least one set of three-phase cells, each three-phase cell comprising an envelope filled with a dielectric gas under pressure with a photodiode disposed therein to provide a signal in the event of an arc appearing, wherein said envelope contains: a three-pole three-phase breaker-disconnector; at least one three-phase grounding disconnector; and a cable outlet for each pole connected to a respective one of the terminals of the breaker-disconnector and passing through the envelope via a respective sealed feedthrough, said at least one set of three cells being connected in series, with each set having two outlets respectively connected to the common points between pairs of adjacent cells in said set.

* * * * *